United States Patent
Dove

(10) Patent No.: US 6,175,392 B1
(45) Date of Patent: Jan. 16, 2001

(54) METHOD AND APPARATUS FOR IMPROVING THE COLOR CONVERGENCE OF PROJECTION-BASED DISPLAYS

(75) Inventor: Derek B. Dove, Mt. Kisco, NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/231,230

(22) Filed: Jan. 14, 1999

(51) Int. Cl.$^7$ .................................................. H04N 9/28
(52) U.S. Cl. ....................... 348/807; 348/782; 348/816; 348/809
(58) Field of Search .................... 348/807, 781, 348/782, 785, 809, 816, 744, 746, 747, 776; H04N 9/28

(56) References Cited

U.S. PATENT DOCUMENTS

| | | | |
|---|---|---|---|
| 2,493,200 | * 1/1950 | Land . | |
| 4,621,293 | * 11/1986 | Matis . | |
| 5,161,042 | * 11/1992 | Hamada . | |
| 5,467,154 | * 11/1995 | Gale | ........................ 348/794 |
| 5,499,061 | * 3/1996 | Oku | ........................ 348/746 |
| 5,548,349 | * 8/1996 | Mizuguchi | ........................ 348/766 |

* cited by examiner

Primary Examiner—Sherrie Hsia
(74) Attorney, Agent, or Firm—Scully, Scott, Murphy & Presser; David M. Shofi, Esq.

(57) ABSTRACT

System and method for improving color convergence in projection display systems employs one or more mirror units disposed for reflecting light from the projection lens to a display screen, each mirror unit including one or more reflective layers adjustably positioned for changing the path length of selected one or more color components of the color image. Changing the path length of the selected one or more color components of the color image effectively changes the magnification of those selected color components according to:

$$\frac{\delta v}{v} = \frac{\delta m}{m}$$

where v is path length traversal of the light from the projection lens to the display screen, $\delta v$ is change in path length effected by the positioning of the reflective layers, m is the magnification factor, and $\delta m$ is the change in magnification factor of a color component required to correct color convergence of a displayed image. Once a desired change in path length is calculated to adjust magnification of the color component to improve color convergence, the relative spacing of the one or more reflective layers in each mirror unit may be determined.

24 Claims, 5 Drawing Sheets

METHOD AND APPARATUS FOR IMPROVING THE COLOR CONVERGENCE OF PROJECTION-BASED DISPLAYS

FIELD OF THE INVENTION

This invention relates to projection display technology and to a system for improving the quality of a color image projected by a projection display.

BACKGROUND OF THE INVENTION

In a projection display, a full color image on the screen is achieved by overlaying separate images containing red, green and blue components. These component images are projected by a common projection lens onto a distant screen for viewing. As described in the reference "Applied Photographic Optics," pages 103–111, Sidney F. Ray, Focal Press, 1994, it is a feature of glass that its refractive index changes with the wavelength of light, and a lens may, therefore, have a different magnification for red, green and blue images. Therefore, it is commonly seen that the red, green and blue component image do not exactly overlap especially at the edges of the screen. This is a serious problem for some applications and it is necessary to construct a projection lens of considerable complexity to attempt to remedy this (color convergence) problem.

To minimize this effect, a lens may consist of a number of elements employing different glasses so as to color correct the lens at two or more specific wavelengths. As displays of higher resolution are developed, the demands on the projection lens become more severe.

In applications such as rear projection monitor or TV, the viewer may approach closely to the screen and misconvergence detracts noticeably from the quality of the image. In electronic theater applications, misconvergence at the edges of the screen is objectionable since some viewers may sit significantly to the side of the screen.

FIG. 1 illustrates the imperfect overlapping of, for example, red and blue images at a screen. The dots may be made to overlap perfectly at the center of the screen by adjustment of the position of the objects being imaged, however, there is a displacement (misconvergence) between the different colored dots toward the edge of the screen.

FIG. 2 shows a highly simplified projection system 50 where a target or panel A, 100, is imaged in red light by a projection lens 200 onto a distant screen 300. The outline of the imaging panel 100 is shown as a square 400 on the screen. A second panel B, 140, is imaged in blue light via a dichroic mirror 180 that reflects blue light, but is transparent to red light. In this way, an image 440 of the panel is produced on the screen in proximity to the image 400.

In a projector, the panels 100, 140 are variously described as light valves or spatial light modulators. The panel may be transmissive in type, that is, light is transmitted through the panel or reflective in type where light is reflected from the panel. The light valves are designed to produce a pattern or image within the light valves from an electronic or other source, that is small in size, e.g., one inch in width. This image is projected onto a distant screen 300 with a magnification of order 20 to 200 times or more.

It can be seen that in the example shown in FIG. 2, the size of the images 400 and 440 are slightly different due to the variation in lens strength with color of light. It is the case that the magnifications cannot be equalized by movement of one of the panels 100 or 140 since there is only one position of correct focus for the panels. To vary the magnification, it is necessary to vary the distance from lens 200 to the screen 300 separately for the two panels, however this is not possible. In a projector, red, green and blue images are required and the optical system may include more than two panels that are imaged onto the screen.

It would be highly desirable to provide an apparatus for improving the color convergence of projection display systems that is simple and does not require modification of the projection optical system.

SUMMARY OF THE INVENTION

The present invention is a system and method for improving color convergence in projection display systems. The system employs one or more mirror units disposed for reflecting light from a projection lens to a display screen, with each mirror unit including one or more reflective layers adjustably positioned for changing the path length of selected one or more color components of a color image to be displayed. Changing the path length of the selected one or more color components of the color image effectively changes the magnification of those selected color components according to:

$$\frac{\delta v}{v} = \frac{\delta m}{m}$$

where v is path length traversal of the light from the projection lens to the display screen, δv is change in path length effected by the positioning of the reflective layers, m is the magnification factor, and δm is the change in magnification factor of a color component required to correct color convergence of a displayed image. Once a desired change in path length is calculated to adjust magnification of the color component to improve color convergence, the relative spacing of the one or more reflective layers in each mirror unit is determined.

It is clear that the deflection of rays by means of one or more plane (i.e., flat) mirrors does not introduce distortion of projected images, but serves only to redirect the rays from the projection lens.

Advantageously, the incorporation of the special mirror device does not require modification of the projection optical/display system. That is, for small corrections to the magnification of the different colored images, the deforming effect due to change in distance to the screen is not objectionable. However, for highly critical applications as, for example, in an electronic cinema installation, the imaging panel in a projector may be moved slightly to achieve correct magnification and the sharpest image.

DETAILED DESCRIPTION OF THE PREFERRED EMBODIMENTS

Figure 2:
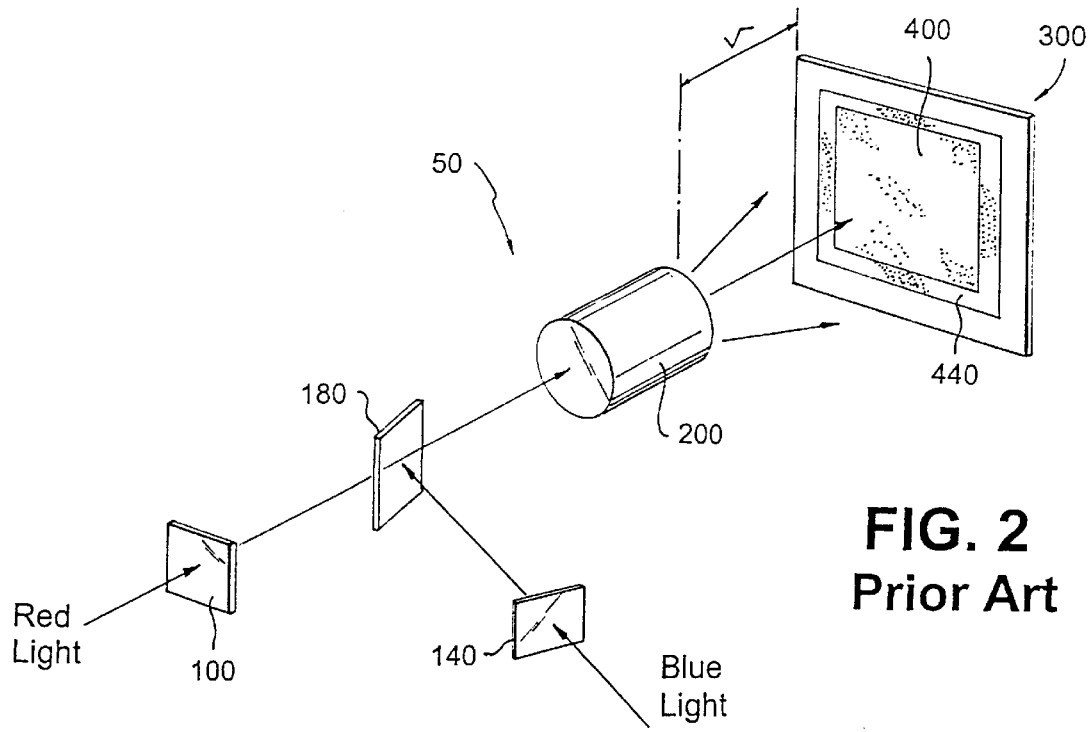
FIG. 2 illustrates the origin of the color convergence problem.

The present invention is a method and apparatus for eliminating misconvergence phenomena in conventional projection display systems by enabling adjustments to the magnification of light components without modifying the projection system. The problem of adjusting magnification is solved by interposing one or more mirror devices between the projection lens 200 and the screen 300 (FIG. 2).

Figure 3:
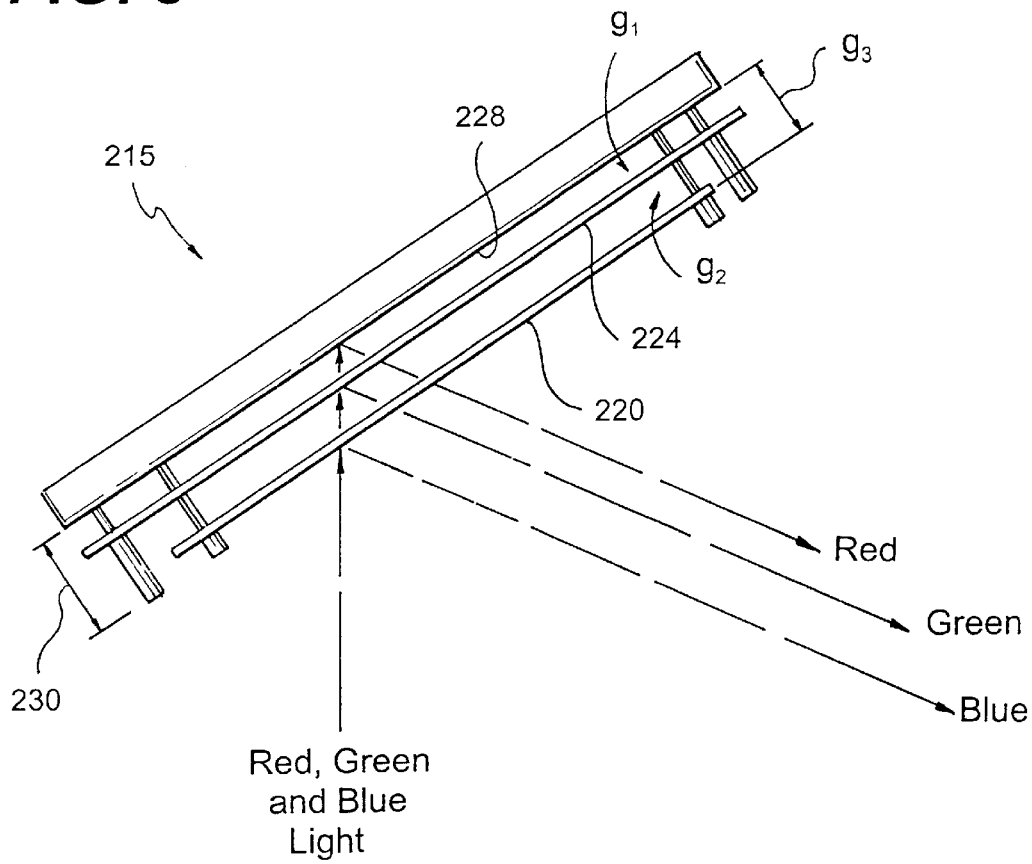
FIG. 3 illustrates the mirror unit used to improve color convergence in the projection display system.

FIG. 3 is a schematic view of the mirror device 215. The mirror device 215 consists of a first mirror 220 that reflects light of one color only, for example, blue, placed parallel to and spaced apart from a second mirror 224 that reflects another color only, for example, green, and a third mirror 228 placed parallel to and spaced apart from the first and second mirrors that reflects the remaining color, for example, red. It should be understood that the mirror device 215 may comprise less than three mirrors, for example, reflecting only two desired color components, e.g., red or blue, of the color image. In this instance, the third mirror device 228 may comprise a normal mirror, i.e., one that reflects all color components of light. Thus, if the path length of only one or two color components need to be changed in order to obtain convergence, the third mirror 228 may comprise a normal mirror and only one or two color reflecting layers need be provided for reflecting only those desired color components.

The color reflecting layers of the mirror 215 may comprise thin glass supporting color selective films, or more conveniently, stretched plastic membranes. Plastic membranes may be obtained as thin as 1 mil inch in thickness and are used when metallized as mirrors in rear projection systems. The individual mirror layers may be coated with color selective dichroic films following known practice. The spacing 230 between each of the individual color selective mirror layers, and particularly, gaps g1, g2 and g3 between each of the respective mirrors, may be adjusted by micrometers or similar devices, as will be explained in further detail herein.

Figure 4:
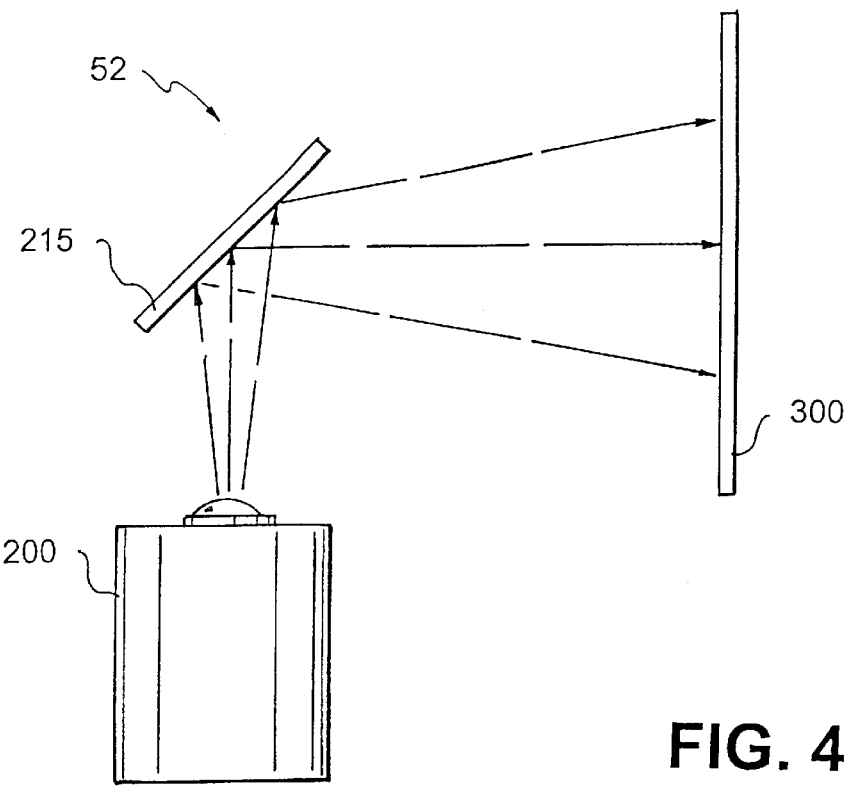
FIG. 4 illustrates a first embodiment implementing a single mirror unit of the invention.

In the projection display system 52, when an image is reflected from this mirror to a screen as shown in FIG. 4, the path between the projection lens and the screen is different now for light of each color. By adjusting the spacing 230, and particularly, gaps g1, g2 and g3 between each of the mirrors, the magnification of each color image component may be adjusted and may be made equal in size. When the mirror device is in place, it may be necessary to move the panels (FIG. 2) into a new focus to produce a sharp image on the screen and to achieve the desired magnification. In most cases, the correction required is small, but the effect on the image quality is appreciable. It is clear that the method of the invention may be implemented in projection systems employing non-polarized light or linearly polarized light and does not depend on details of the projector optical system provided a single projection lens is used.

The sideways image displacement between the red, green and blue images may also introduce a lateral shift of the color pixels, which may be corrected by lateral shift of the light valve or by an electronic shift of the image generated within the light valve. To avoid the relative image displacement associated with the use of a single mirror unit, two mirror units may be implemented in the optical system as shown in FIG. 5.

Figure 5:
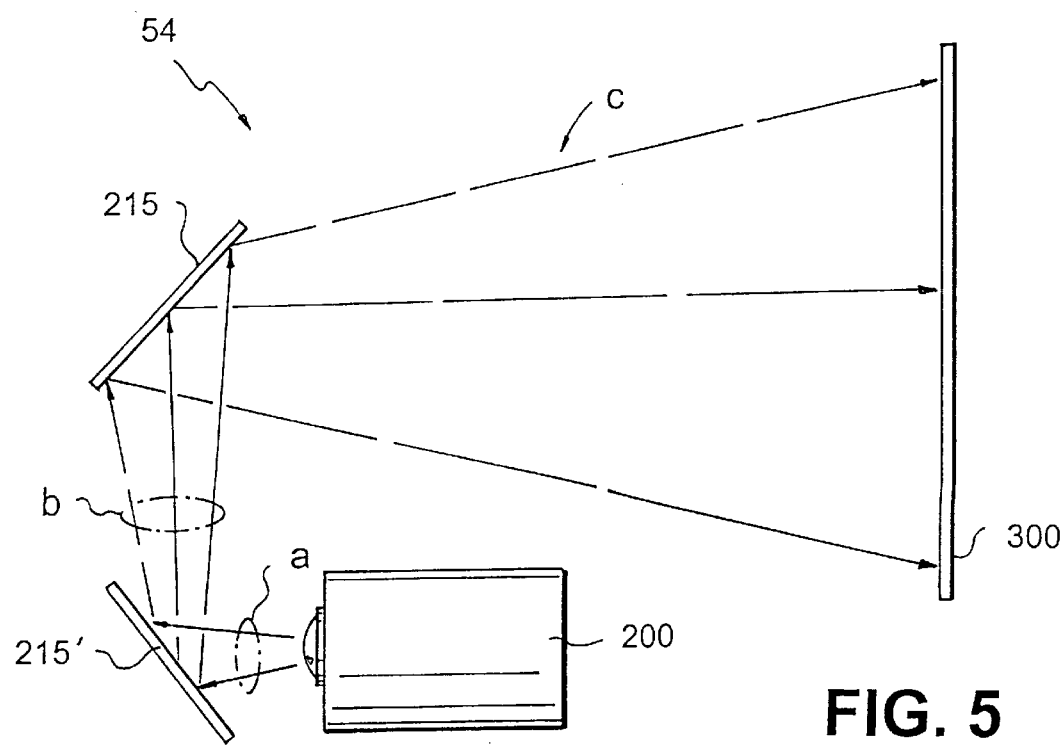
FIG. 5 illustrates a second embodiment implementing a two mirror units of the invention for improved image display.

As shown in FIG. 5, in the projection display system 54, two reflections are used. In FIG. 5, a second mirror 215' is provided for reflective light "a" along a path "b" for reflection "c" of first mirror 215. In this case, the lateral shift is canceled without hindering the magnification adjustment capability. This is because the angle positioning of said first and second mirrors 215 and 215' is such that incident light that may be laterally shifted due to reflection, at or near edges of the first mirror device 215', are cancelled by the provision of the second mirror device 215 which is at a complementary angle sufficient for re-shifting the light components near the edges of the second mirror unit 215.

Figure 6:
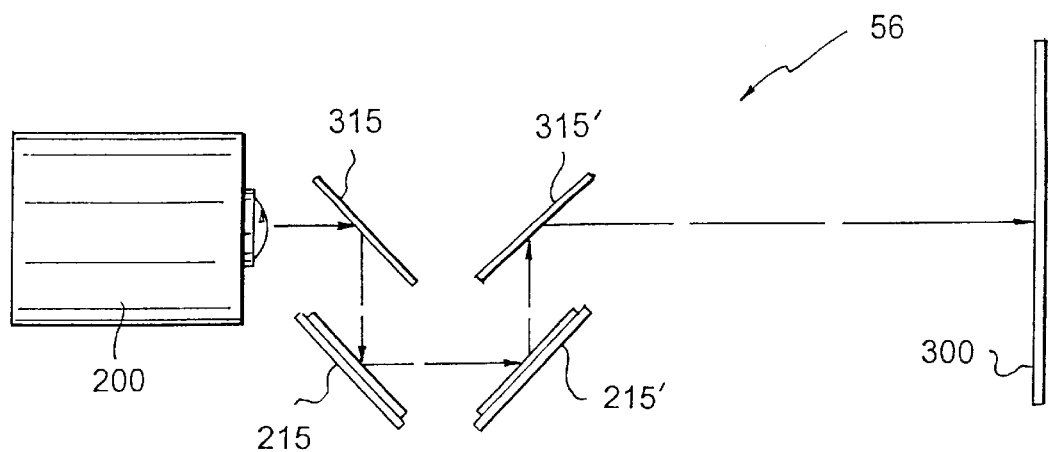
FIG. 6 illustrates a third embodiment implementing two mirror units of the invention.

FIG. 6 illustrates another embodiment of the projection display system and mirror devices. In the projection display system 56 of this embodiment, a first normal mirror device 315, i.e., reflecting all color components of light, is positioned to receive light from the projection lens 200 and to reflect light to the mirror device 215 (FIG. 3). Mirror device 215, in turn, reflects the light back to a second mirror device 215' (FIG. 3) which, in turn, reflects the light to a conventional mirror device 315' which further reflects the light to screen 300. It is apparent that in this embodiment of the projection display system 56, the projection lens 200 remains in line with the display screen 300.

Figure 7:
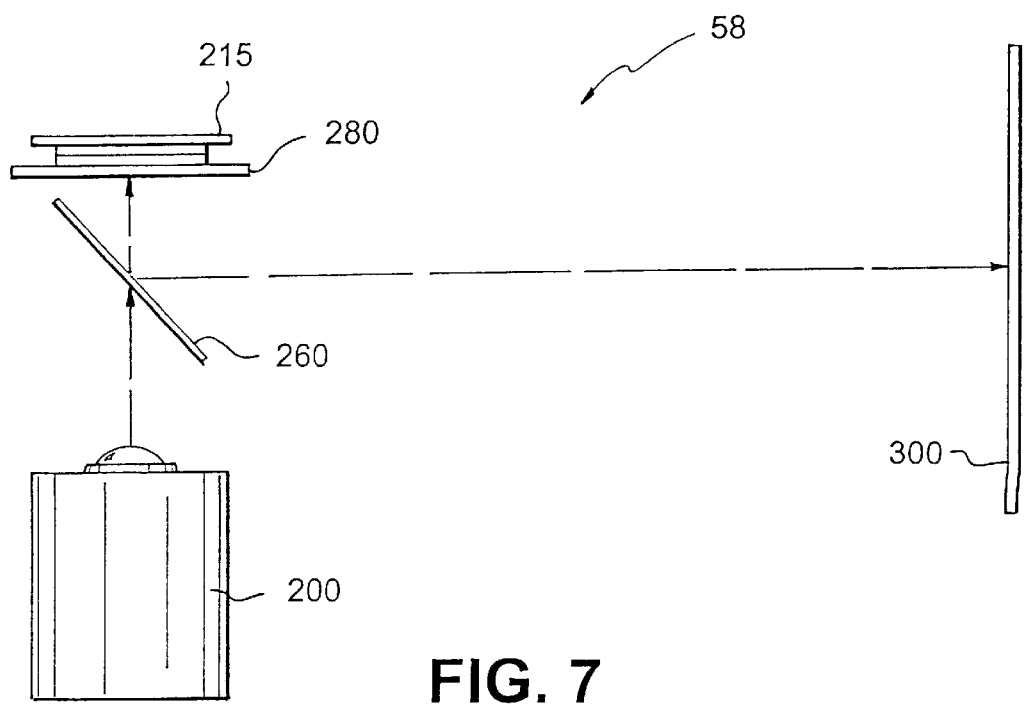
FIG. 7 illustrates a fourth embodiment implementing a mirror unit of the invention in a projection display system incorporating polarized light.

FIG. 7 illustrates a method embodiment permitting the use of polarized light. In the embodiment of FIG. 7, a polarizing beam splitting mirror 260 or prism is placed between the projection lens 200 and the mirror device 215. Polarized light, e.g., in a "P" direction, from the projector passes in transmission through the polarizing beam splitter mirror 260 and traverses a quarter wave plate 280 before reaching the mirror device 215. The beam is reflected by the mirror device 215 as described in FIG. 2 and traverses the quarter wave plate 280 a second time. The polarization direction of the beam is, therefore, rotated by 180 degrees (half-wave length), resulting, e.g., in a color corrected polarized beam, e.g., in the "S" direction, that is reflected by the polarizing beam splitter mirror 260 to produce an image onto a distant screen 300 instead of traversing it. This method has the advantage of no net lateral shift and good compactness.

It is the case that in each of the systems 52, 54, 56, and 58 (FIGS. 4–7) the fractional change in magnification (delta m)/m of the color image components on the screen 300 is related to the fractional change in path length (delta v)/v between the projection lens 200 and screen 300 according to equation 1) as follows:

$$(\delta m)/m = (\delta v) \cdot (m+1)/(mv) \tag{1}$$

where "m" is the magnification, "v" is the path length, δm is the change in magnification, and δv is the change in path length. Since "m" is always much greater than 1, equation 2) provides a good approximation of this relationship:

$$(\delta m)/m = (\delta v)/v \tag{2}$$

Figure 1:
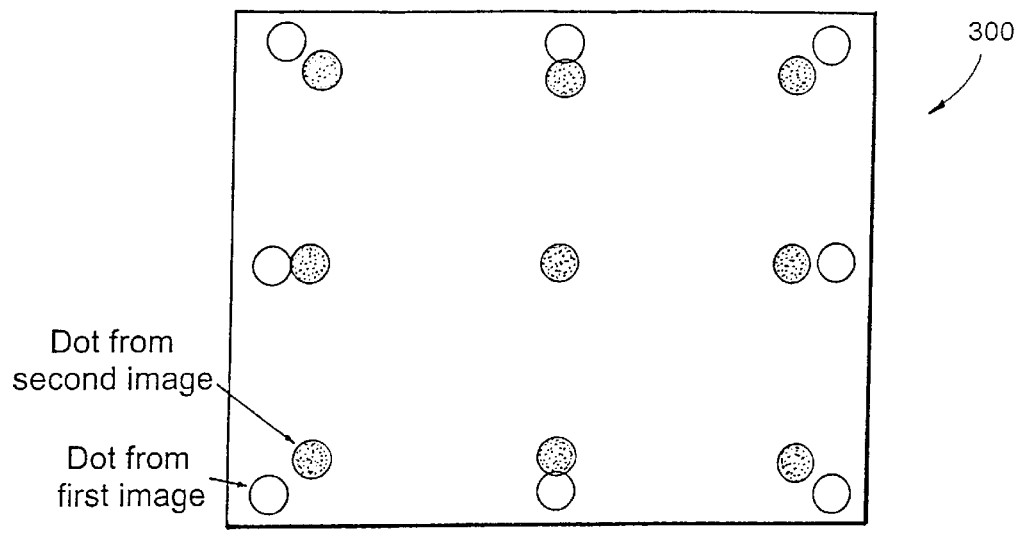
FIG. 1 illustrates an example of an image showing lack of color convergence.
Figure 8A:
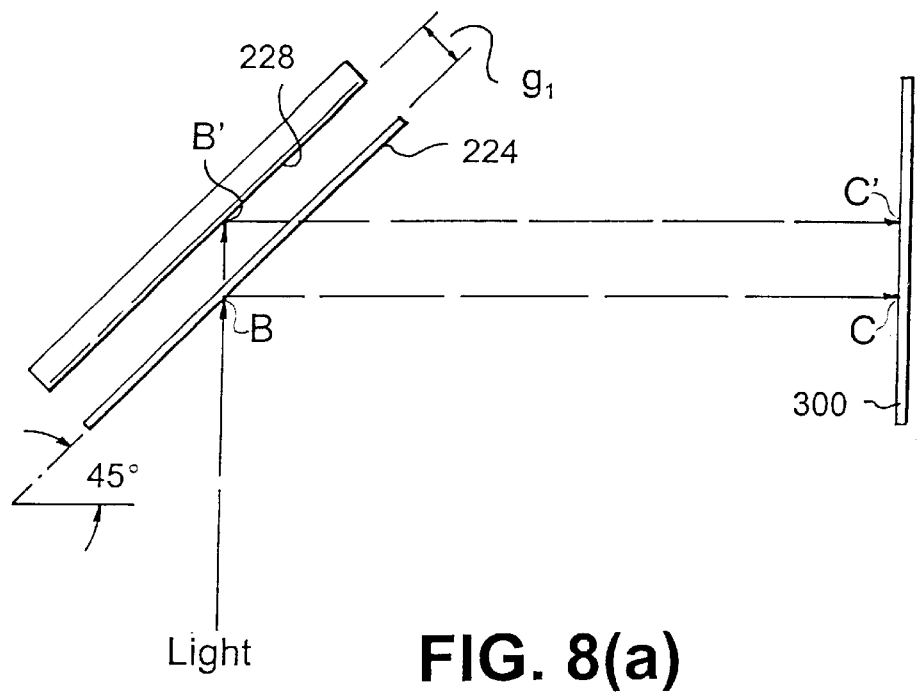
FIG. 8(a) depicts the change in path length δv introduced by placement of a mirror device between the projection lens and the display screen according to the embodiment of FIG. 4.

Referring back to FIG. 3, and making use of the relationship set forth in equation 2, changes in gap lengths g1, g2, and g3 may readily determined by determining the respective δv's (changes in path lengths) for each color component in order to achieve a desired magnification. Thus, as shown in FIG. 8(a), for the case of a single mirror unit 215 oriented at 45° angle with respect to incident light from the projection lens, δv is shown equal to the extra path length labeled B-B' which, implementing simple geometry, is equal to 1.4 times the gap length g1 which is the distance between the first reflecting layer 224 and the second reflecting layer 228 (FIG. 3). It is this extra path length δv that gives rise to the change in magnification δm for that color component. As further shown in FIGS. 4 and 8(a) for the case of a single mirror unit 215 oriented at 45° angle with respect to incident light from the projection lens, the color component of light reflected by mirror 228 is subject to a lateral displacement shown in FIG. 8(a) as a distance C-C' which also equals the length B-B'. In the case of a single mirror unit 215, correction for this lateral displacement of the selected color component may be achieved by displacing the position of the panel slightly, as shown in FIG. 1.

Figure 8B:
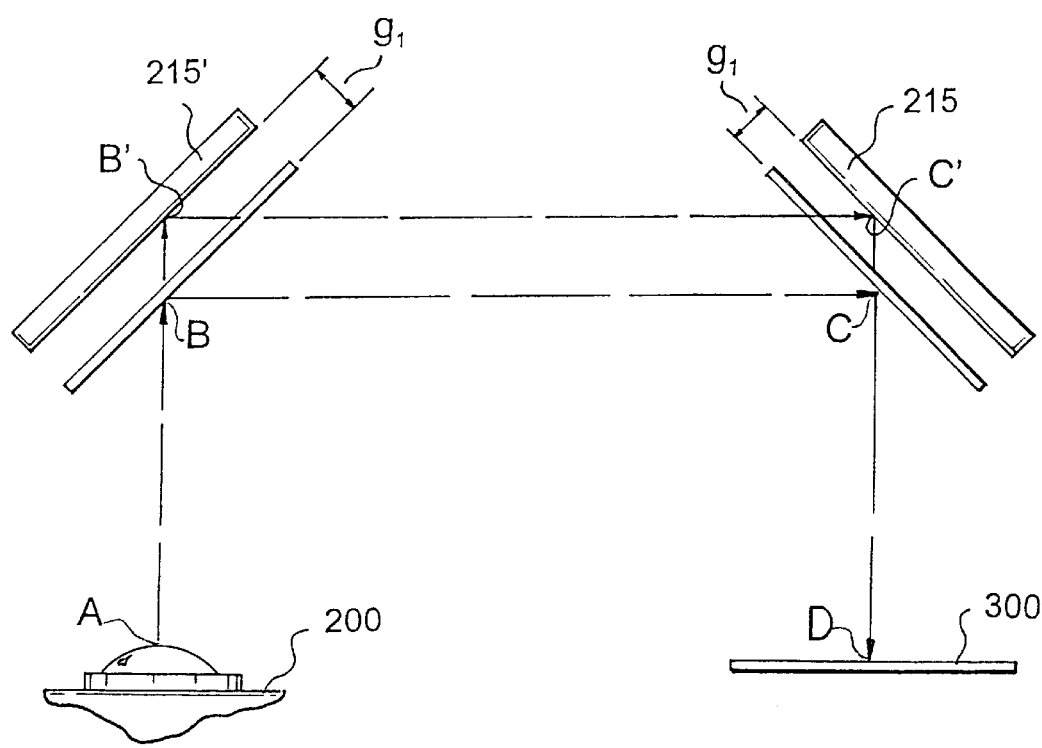
FIG. 8(b) depicts the change in path length δv introduced by placement of two mirror devices between the projection lens and the display screen according to the embodiment of FIG. 5.

For the case of two mirror components 215 and 215' between the oriented at 45° angles as shown in the embodiment 54 of FIG. 5 and in FIG. 8(b), the change in path length δv is equal to the addition of lengths B-B' due to the presence of mirror 215' and the distance C-C' due to the presence of mirror 215. As shown in FIG. 8(b), implementing simple geometry, this extra path length is approximately equal to 2×1.4 times the gap distance g1 between the first reflecting layer 224 and the second reflecting layer 228 of each respective mirror units, i.e., δv=2.8×g1. As further shown in FIG. 8(b), and as described herein, the use of two mirrors enables the cancellation in lateral shift so that there is no net displacement of the color component on the display screen 300.

It should be understood that the foregoing description relating to the calculation of change in path length δv may be readily derived for the general case of a mirror unit 215 oriented and an arbitrary angle with respect to incident light from the projector lens.

Figure 9:
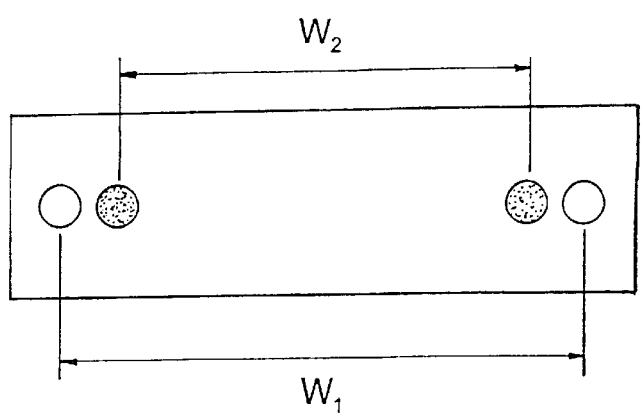
FIG. 9 depicts the color convergence problem showing a lateral displacement of color pixels at an edge of a screen.

Referring further to FIG. 9, a screen 300 is shown having color pixels at locations exemplifying misconvergence problem. In FIG. 9, the change in magnification δm/m required to correct the color convergence is equal to (W1−W2)/(W1), where W1 is the distance between pixels of a first color component of the image and W2 is the distance between corresponding image pixels of a second color component of the image. In order to correct the color convergence problem shown in FIG. 9, for the case of the projection display system 54 of the invention having two mirror units as shown in the embodiment of FIG. 5 and FIG. 8(b), the relation δv=2.8×g1 applies. Solving for g1, the gap length required between the two reflecting mirrors is equal to g1=v×(W1−W2)/(W1×2.8). Thus, for example, if v=50 meters and (W1−W2)/(W1) is approximately on the order of $1 \times 10^{-2}$, then the gap lengths g1 of the convergence correcting mirrors 215, 215' is equal to $(50/2.8) \times 10^{-2} = 0.18$ m approximately. If (W1−W2)/(W1) is approximately on the order of $1 \times 10^{-3}$, then the gap length g1 is equal to $(50/2.8) \times 10^{-3}$, i.e., 1.8 cm approximately.

Generally, as seen in FIG. 1, red and blue pixels in a display may be separated by a distance of order 1 pixel at the edge of the screen even with a good lens, indicating a magnification correction needed of order 2/N where N is the number of pixels across the width of the screen. Hence, the change in path length needed to correct for a 1 pixel convergence error at the edge of the screen is given by equation 3) as follows:

$$\delta v = 2v/N \quad (3)$$

Thus, using the simple relationships given herein, it is straightforward to calculate the gaps for the mirror device 215 of FIG. 3 from simple geometry as the following examples illustrate.

In a first example, a projection system comprises and an auditorium projector where v=50 meters and N=1280 pixels, then δv=8 cm. In another example, a rear projection display includes a projector where v=1.5 meters and N=1280, then δv=2.3 mm. These extremes may be readily achieved with the multilayer mirror according to the invention. One reflection from the convergence correcting mirror at a 45-degree angle of incidence introduces a path difference δv of 1.4× gap between mirrors. Using the arrangement of FIG. 5, the use of two mirrors introduces a path difference of 2.8×gap. The gaps required for the two examples above are calculated to be 2.9 mm and 0.8 mm, respectively. If the gap between the reflecting surfaces is filled with a material of index other than that of air, a trivial adjustment within the purview of skilled artisans would be needed to accommodate for this.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A projection display system comprising:
    a display screen;
    a projection lens for generating light having red, green and blue (RGB) color light components that comprise a color image for display on said display screen; and,
    a first color correction unit disposed in said projection display system for reflecting light from said projection lens onto said display screen, said first color correction unit including two or more reflecting devices disposed parallel to each other for receiving said light, each reflecting device for reflecting a color component of said RGB components of said image, each said two or more reflecting devices being positioned to alter a path length of a selected color component for adjusting magnification of said selected color component of said color image to thereby improve color convergence of said color image to be displayed.

2. The system as claimed in claim 1, wherein said two or more reflecting devices includes:
    a first reflecting device for reflecting light of a first color of said RGB components;
    a second reflecting device disposed parallel to and adjustably spaced apart from said first reflecting device for reflecting light of a second color of said RGB components; and,
    a third reflecting device disposed parallel to and adjustably spaced apart from said first and second reflecting devices for reflecting light of a third color component of said RGB components, each said first, second and third reflecting devices being spaced by and an amount sufficient for altering a path length of a respective color component of said color image to be displayed.

3. The system as claimed in claim 2, wherein each said first, second and third reflecting devices comprises a color selective dichroic film.

4. The system as claimed in claim 2, wherein each said first, second and third reflecting devices includes a plastic membrane support layer having a color selective coating.

5. The system as claimed in claim 2, wherein each said first, second and third reflecting devices includes a thin glass support layer having a color selective coating.

6. The system as claimed in claim 2, further comprising means for adjusting spacing between said first, second and third reflecting devices.

7. The system as claimed in claim 1, wherein said projection display system employs non-polarized light.

8. The system as claimed in claim 1, wherein said projection display system employs linearly polarized light.

9. The system as claimed in claim 1, wherein each said reflecting device of said first color correction unit is disposed at and an angle for reflecting light at and an angle with respect to incident light received from the projection lens.

10. The system as claimed in claim 1, wherein a path length v represents a traversal of light including said color image between said projection lens and said display screen, and a factor m represents a magnification of said color image to be displayed, said magnification of said color image being substantially related to said path length according to:

$$\frac{\delta v}{v} = \frac{\delta m}{m},$$

where $\delta v$ is a change in path length of a color component of said image introduced according to placement of a reflecting device associated with a selected color component of the image to be displayed and $\delta m$ is a desired change in magnification of that selected color component necessary to achieve correct color convergence.

11. The system as claimed in claim 1, further including a second color correction unit interposed for receiving reflected light from said first color correction unit and for directing said reflected light to said display screen, said second color correction unit including two or more reflecting devices, each reflecting device for reflecting a color component of said RGB components of said image, each said two or more reflecting devices being positioned to adjust magnification of each respective color component of said color image, whereby reflecting devices of respective said first and second color correction units are cooperatively positioned to further improve color convergence of a color image reflected on said display screen.

12. The system as claimed in claim 11, wherein said first color correction unit and corresponding reflecting devices is positioned at a first angle with respect to incident light from said projection lens, and said second color correction unit is positioned at a second angle with respect to incident light reflected from said first color correction unit, whereby any lateral shift of said light provided by reflection off a reflecting device of said first color correction unit is corrected by provision of a corresponding reflecting device in said second color correction unit.

13. A color correction unit for improving color convergence of a projection display system including a projection lens for generating a color image for display on a display screen, said color correction unit comprising: i) a first reflecting device for reflecting light of a first color component of said RGB components; and ii) a second reflecting device disposed parallel to and adjustably spaced apart from said first reflecting device for reflecting light of a second color component of said RGB components, each one of said first and second reflecting devices being spaced apart for altering a path length of each said first and second color components to respectively adjust magnification of each color component to thereby improve color convergence of and an image on said display screen.

14. The color correction unit as claimed in claim 13, further including a third reflecting device disposed parallel to and adjustably spread apart from said first and second reflecting devices for reflecting light of a third color component of said RGB components.

15. The color correction unit as claimed in claim 13, wherein each said reflecting device includes a color selective dichroic film.

16. The color correction unit as claimed in claim 13, wherein each said reflecting device includes a plastic membrane support layer having a color selective coating.

17. The color correction unit as claimed in claim 13, wherein each said reflecting device includes a thin glass support layer having a color selective coating.

18. The color correction unit as claimed in claim 13, wherein each said reflecting device of said color correction unit is disposed at and an angle for reflecting light at and an angle with respect to incident light received from the projection lens.

19. A method for improving color convergence of a projection display system including a projection lens for generating light having RGB components of a color image to be displayed on a display screen, said method comprising the steps of:

providing a first color correction unit for reflecting said light from said projection lens to be displayed, said first color correction unit including first means for reflecting one or more color components of said color image in a manner so as to change a path length of one or more color components of said color image to be displayed;

providing a second color correction unit spaced apart from said first color correction unit, said second color correction unit for reflecting light received from said first color correction unit on to said display screen, said second color correction unit including second means for reflecting one or more color components for changing the path length of one or more color components of said color image to be displayed; and, adjusting position of said first and second means for reflecting of respective first and second color correction units for changing path length of a respective color component of said color image to be displayed to thereby correct color convergence of said color image as observed at said screen.

20. The method as claimed in claim 19, wherein each said first and second reflecting means includes a mirror and a reflective layer for reflecting light of a selected color component of said RGB color image to be displayed.

21. The method as claimed in claim 19, wherein said step of adjusting position includes changing said path length of a selected color component of said color image according to:

$$\frac{\delta v}{v} = \frac{\delta m}{m}$$

where v is path length of light traversing from said projection lens to said screen, $\delta v$ is change in path length introduced according to placement of said mirror unit, m is the magnification factor of said color image, and $\delta m$ is the change in magnification factor of a color component required to correct color convergence of a displayed image.

22. A system for improving convergence of color images in a projection display system having a projection lens for generating light having red, green and blue (RGB) color light components that comprise a color image for display on a display screen, said system comprising:

first color correction unit for reflecting light from said projection lens to be displayed, said first color correction unit including first means for reflecting selected one or more color components of said color image in a manner so as to change a path length of one or more color components of said color image to be displayed; and, second color correction unit spaced apart from said first color correction unit for reflecting light received from said first color correction unit on to said display screen, said second color correction unit including second means for reflecting said selected one or more color components of said color image in a manner so as to change the path length of one or more color components of said color image to be displayed;

wherein positions of each said first means for reflecting and second means for reflecting, in conjunction with an angular orientation of said reflecting means relative to said projection lens and said display screen, are respectively adjusted to effect desired change of said path length of said selected one or more color components of said color image to thereby improve color convergence of said color image at said display screen.

23. The system as claimed in claim 22, further comprising:

a beam-splitting device disposed linearly between said projection lens and said first color correction unit, for passing light linearly polarized in a first direction to said first color correction unit; and, a wavelength modifying device disposed linearly between said beam-splitting device and said first color correction unit for modifying the wavelength of said polarized light;

wherein reflecting light having color components of adjusted magnification from said first color correction unit is reflected back through said wavelength modifying device and received by said beam splitting device in a second linearly polarized direction opposite the first polarized direction, said beam-splitting device further reflecting said light of said second linearly polarized direction to said display screen.

24. The system as claimed in claim 23, wherein said wavelength modifying device comprises a quarter-wave plate.

* * * * *